(12) United States Patent
Jassal et al.

(10) Patent No.: US 12,476,509 B2
(45) Date of Patent: Nov. 18, 2025

(54) PREFORMED COIL FOR AN ELECTRIC MACHINE HAVING A PERFORATED INSULATING BODY AND METHOD OF MAKING SAME

(71) Applicant: VESTAS WIND SYSTEMS A/S, Aarhus N (DK)

(72) Inventors: Anoop Jassal, Højbjerg (DK); Xiaowei Song, Risskov (DK); Torben Werge Møller, Ringkøbing (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/560,335

(22) PCT Filed: May 12, 2022

(86) PCT No.: PCT/DK2022/050097
§ 371 (c)(1),
(2) Date: Nov. 10, 2023

(87) PCT Pub. No.: WO2022/237947
PCT Pub. Date: Nov. 17, 2022

(65) Prior Publication Data
US 2024/0235308 A1    Jul. 11, 2024

(30) Foreign Application Priority Data
May 12, 2021  (DK) .............. PA 2021 70234

(51) Int. Cl.
*H02K 3/34*  (2006.01)
*H02K 3/24*  (2006.01)
(Continued)

(52) U.S. Cl.
CPC .............. *H02K 3/34* (2013.01); *H02K 3/24* (2013.01); *H02K 7/1838* (2013.01);
(Continued)

(58) Field of Classification Search
CPC .......... H02K 3/34; H02K 3/24; H02K 7/1838; H02K 15/12; H02K 2215/00; Y02E 10/72
See application file for complete search history.

(56) References Cited

U.S. PATENT DOCUMENTS

| | | | | |
|---|---|---|---|---|
| 815,406 | A | * | 3/1906 | Cook ............ H01H 71/205 337/152 |
| 1,723,839 | A | * | 8/1929 | Burnham ............ H01F 27/322 336/197 |

(Continued)

FOREIGN PATENT DOCUMENTS

| | | | | |
|---|---|---|---|---|
| GB | 2505468 A | * | 3/2014 | ............ F28D 7/005 |
| GB | 2505470 A | * | 3/2014 | ............ H02K 15/125 |

(Continued)

OTHER PUBLICATIONS

PCT, International Search Report and Written Opinion of The International Searching Authority for Application PCT/DK2022/050097 dated Aug. 22, 2022.

(Continued)

*Primary Examiner* — Pedro J Cuevas
(74) *Attorney, Agent, or Firm* — Patterson + Sheridan, LLP; Gero G. McClellan

(57) ABSTRACT

A coil for an electric machine including a conductive strand having a first end, a second end, and a plurality of windings between the first and second ends and an electric insulating body within which the conductive strand is at least partially encased, wherein at least a portion of the insulating body includes perforations that allow a coolant to penetrate into the insulating body to cool the coil during use of the electric machine. A method of making the coil includes molding or printing the insulating body about the conductive strand so as to have perforations therein.

19 Claims, 11 Drawing Sheets

(51) Int. Cl.
*H02K 7/18* (2006.01)
*H02K 15/10* (2025.01)
*H02K 15/12* (2025.01)

(52) U.S. Cl.
CPC ........... *H02K 15/105* (2013.01); *H02K 15/12* (2013.01); *H02K 2215/00* (2021.08)

(56) References Cited

U.S. PATENT DOCUMENTS

| | | | | |
|---|---|---|---|---|
| 2,755,395 A * | 7/1956 | Kilner | ............... | H02K 3/24 310/179 |
| 3,131,321 A * | 4/1964 | Willyoung | ............... | H02K 3/22 310/64 |
| 3,261,087 A * | 7/1966 | Schlumberger | ........ | F16J 15/102 52/409 |
| 3,467,076 A * | 9/1969 | Brenner | ............... | A61N 2/02 335/297 |
| 3,749,950 A | 7/1973 | Lenz | | |
| 3,781,581 A | 12/1973 | Lehuen et al. | | |
| 3,814,959 A * | 6/1974 | Lehuen | ............... | H02K 9/08 310/55 |
| 4,152,610 A | 5/1979 | Wallenstein | | |
| 4,384,168 A * | 5/1983 | Kenney | ............... | H01F 6/06 174/117 FF |
| 4,447,947 A | 5/1984 | McCarty | | |
| 4,633,116 A | 12/1986 | Derderian | | |
| 4,677,334 A * | 6/1987 | Finegold | ............... | H02K 15/08 310/43 |
| 4,739,202 A * | 4/1988 | Hatanaka | ............... | H02K 55/04 335/216 |
| 4,756,075 A * | 7/1988 | Dolgas | ............... | H02K 23/54 29/733 |
| 6,262,503 B1 | 7/2001 | Liebman et al. | | |
| 6,459,180 B1 * | 10/2002 | Mori | ............... | H02K 15/0414 310/201 |
| 6,533,209 B2 * | 3/2003 | Stratico | ............... | H02K 15/33 242/432.4 |
| 6,545,377 B2 * | 4/2003 | Bisschops | ............... | H02K 3/24 310/12.21 |
| 6,621,187 B2 * | 9/2003 | Mori | ............... | H02K 3/24 310/201 |
| 6,758,429 B2 * | 7/2004 | Stratico | ............... | H02K 15/30 242/432.4 |
| 6,774,515 B2 * | 8/2004 | Mori | ............... | H02K 15/0414 310/201 |
| 6,956,309 B2 * | 10/2005 | Aulanko | ............... | H02K 1/182 310/67 R |
| 7,791,230 B2 * | 9/2010 | Kaminski | ............... | H02K 3/24 310/216.069 |
| 7,816,825 B2 * | 10/2010 | Jarczynski | ............... | H02K 1/32 310/58 |
| 8,049,379 B2 * | 11/2011 | Buskirk | ............... | H02K 3/24 310/58 |
| 8,111,123 B2 * | 2/2012 | Lim | ............... | H01F 27/322 336/55 |
| 9,404,417 B2 * | 8/2016 | Norrick | ............... | F02B 77/11 |
| 10,284,039 B2 * | 5/2019 | Nagayasu | ............... | H02K 1/32 |
| 11,376,785 B2 * | 7/2022 | De Jong | ............... | H05K 1/165 |
| 11,804,744 B2 * | 10/2023 | Duan | ............... | H02K 1/2798 |
| 12,078,700 B2 * | 9/2024 | Tang | ............... | G01R 33/385 |
| 2001/0047580 A1 * | 12/2001 | Stratico | ............... | H02K 15/30 242/432.4 |
| 2002/0096946 A1 * | 7/2002 | Bisschops | ............... | H02K 3/24 310/58 |
| 2002/0185921 A1 * | 12/2002 | Mori | ............... | H02K 3/24 310/58 |
| 2002/0185923 A1 * | 12/2002 | Mori | ............... | H02K 15/0414 310/61 |
| 2003/0106954 A1 * | 6/2003 | Stratico | ............... | H02K 15/33 242/432.4 |
| 2005/0023926 A1 * | 2/2005 | Aulanko | ............... | H02K 5/1732 310/67 R |
| 2009/0120026 A1 * | 5/2009 | Wetzel | ............... | E04B 1/161 52/649.1 |
| 2010/0270094 A1 | 10/2010 | Nakayama et al. | | |
| 2010/0270876 A1 * | 10/2010 | Buskirk | ............... | H02K 3/24 310/61 |
| 2011/0063062 A1 * | 3/2011 | Lim | ............... | H01F 41/127 29/605 |
| 2014/0150437 A1 * | 6/2014 | Norrick | ............... | H02K 9/08 60/39.83 |
| 2014/0183989 A1 | 7/2014 | Lenschow | | |
| 2015/0197062 A1 * | 7/2015 | Shinar | ............... | B29C 64/182 700/98 |
| 2015/0197063 A1 * | 7/2015 | Shinar | ............... | G06F 30/39 700/98 |
| 2015/0201499 A1 * | 7/2015 | Shinar | ............... | H05K 1/0284 425/132 |
| 2015/0201500 A1 * | 7/2015 | Shinar | ............... | B29C 64/112 425/132 |
| 2017/0033632 A1 * | 2/2017 | Nagayasu | ............... | H02K 3/24 |
| 2018/0205298 A1 | 7/2018 | Huang et al. | | |
| 2018/0330863 A1 * | 11/2018 | Hwang | ............... | H01F 27/2876 |
| 2019/0140505 A1 | 5/2019 | Röer | | |
| 2020/0161947 A1 | 5/2020 | Almeida E Silva et al. | | |
| 2020/0361138 A1 * | 11/2020 | De Jong | ............... | H05K 1/165 |
| 2020/0373800 A1 | 11/2020 | Stoll et al. | | |
| 2021/0163143 A1 * | 6/2021 | Mercat | ............... | B32B 5/18 |
| 2022/0397621 A1 * | 12/2022 | Tang | ............... | G01R 33/385 |
| 2023/0291258 A1 * | 9/2023 | Duan | ............... | H02K 1/08 |
| 2023/0356175 A1 * | 11/2023 | Wegeng | ............... | B01J 19/0013 |
| 2024/0212914 A1 * | 6/2024 | Mao | ............... | H01F 27/29 |

FOREIGN PATENT DOCUMENTS

| | | | | |
|---|---|---|---|---|
| GB | 2505472 A * | 3/2014 | ............... | H02K 1/18 |
| GB | 2505473 A * | 3/2014 | ............... | H02K 1/17 |
| GB | 2505475 A * | 3/2014 | ............... | F16B 13/045 |
| GB | 2505479 A * | 3/2014 | ............... | H02K 1/30 |
| WO | WO-2022237947 A1 * | 11/2022 | ........... | H02K 15/105 |

OTHER PUBLICATIONS

Danish Patent and Trademark Office, 1st Technical Examination including The Search Report and Search Opinion for Application PA 2021 70234 dated Nov. 17, 2021.

* cited by examiner

PREFORMED COIL FOR AN ELECTRIC MACHINE HAVING A PERFORATED INSULATING BODY AND METHOD OF MAKING SAME

TECHNICAL FIELD

This invention relates generally to electric machines, and more particularly to a preformed coil for an electric machine having conductor windings encased within a perforated insulating body that provides sufficient electrical insulation to the coil while facilitating improved cooling of the conductor windings. The invention also relates to a method of making a preformed coil for an electrical machine having such a perforated insulating body.

BACKGROUND

An electric machine is a general term for electric motors, electric generators, and other electromagnetic devices, including but not limited to magnetic bearings, electromagnets, actuators, solenoids, eddy current brakes, transformers, etc. One example of an electric machine is a generator for a wind turbine. Generally, a wind turbine converts kinetic energy from the wind into mechanical energy and then subsequently converts the mechanical energy into electrical power. A horizontal-axis wind turbine includes a tower, a nacelle located at the apex of the tower, and a rotor having one or more blades supported in the nacelle. Wind activates the rotor to turn a main drive shaft that is coupled directly or indirectly (such as through a gear system) to a generator located within the nacelle of the wind turbine, for example. The generator then converts the rotation of the main drive shaft to electrical power which may then be introduced into an electric distribution grid.

The generator typically includes a stator assembly and a rotor assembly concentrically disposed relative to each other within an outer housing. The stator assembly is generally fixed and stationary and includes a plurality of coils, while the rotor assembly includes a plurality of magnets and is configured to rotate relative to the stator assembly. The magnets and coils are separated from each other across an air gap through which the magnetic field generated by the magnets must pass. The stator assembly and rotor assembly cooperate to convert the mechanical energy from the rotor into electrical energy so that the kinetic energy of the wind is harnessed for power generation. Specifically, the movement of the magnets of the rotor assembly past the stationary coils of the stator assembly induces an electrical current in the coils according to the precepts of Faraday's Law.

Modern stator assembly construction includes a ferromagnetic stator core having a plurality of slots disposed therein. During assembly, conductive coils are packed within the slots of the stator core. In many cases, the coils are configured as a preformed unit, having a predetermined shape and design that may be easily and efficiently positioned within the slots of the stator core to facilitate assembly. Thus, the coils may be manufactured separately and supplied to a manufacturer for incorporation into the generator as a pre-manufactured unit.

The manufacture of preformed coils for electric machines, including wind turbine generators, generally includes three main processing steps. In a first processing step, a conductive turn is formed comprising of one or more conductors/strands having a thin layer of electrical insulation (generally referred to as strand insulation) disposed about the conductors (generally made of copper). The conductors that form the conductive strand are disposed about large spools and typically provided to a spooling or looping machine for winding the conductive strand into a loop of the coil. A group of insulated strands may be insulated further (by taping an insulation film) to form turn insulation. In many cases, strand insulation can act as turn insulation.

In a second processing step, the looped coil may be placed into a shaping machine for stretching the windings and forming the coil into net shape of the preformed manufactured coil. By way of example, this processing step may be configured to provide a net shape raw coil having diamond-shaped lap windings, which remain popular for three-phase electric generator applications. The raw coil generally includes linear or straight slot windings configured to be received within the slots in the stator core and curvilinear end windings at opposed ends of the slot windings configured to extend outside of the slots in the stator core when the coils are positioned therein.

In a third processing step, in addition to the strand insulation on the conductive strands, the coils are provided with additional slot insulation or glass tape to further electrically isolate the coil windings from each other and from other elements of the stator assembly, such as the stator core. This insulation also provides mechanical stability. In this regard, the net shape windings are provided to one or more taping machines that apply one or more layers of tape about the windings. For example, this process may provide mica turn tape, a ground wall tape, a conductive tape, a stress grading tape, an armor/protective tape, or other solid insulators known in the art. The ground wall insulation layer or layers that surround each coil may utilize wrapped tape layers having resin components that are then cured or otherwise heated to form the ground wall insulation structure. Moreover, the end windings may require manual taping processes to provide the additional turn insulation along these portions of the windings.

While coils made according to the method described above are generally successful for their intended purpose in electric machines, there are some drawbacks that manufacturers strive to improve upon. By way of example, the process for applying the additional turn and ground wall insulation to the coil is expensive and time-consuming, involving complex machinery and manual labour to complete a formed coil ready for insertion into the electric machine.

Another drawback is that the addition of turn and ground wall insulation, while providing electrical insulation for the coil, makes cooling the coils in the electric machine challenging, as many insulating materials are rather poor conductors of heat. In many cases, for example, the electrical insulation often acts as a thermal insulator, thereby increasing the thermal resistance between the conductive strand and the outside of the coil that is subject to a cooling medium that transfers generated heat away from the coil. For example, the ground wall insulation of coils often involves mica layers that operate as thermal insulators. The thermal resistance between the conductive strand and the cooling medium is important because it represents a barrier to the amount of heat capable of being transferred from the coils, and therefore is a factor in determining the current carrying capability as well as operating temperature of the coils during operation. The operating temperature is, in turn, important because it directly impacts the life expectancy of the coils and is a significant contributor to the electrical losses in the windings of the coil, which affects the efficiency of the generator in converting mechanical power into electrical power. In this regard, it is known that an increase in the operating temperature by just a few degrees dramatically reduces the life expectancy of the coils. For example, a rise of just 5-8 degrees Celsius in the operating temperature may reduce the life expectancy of the coils by half. Moreover, it is known that winding resistance is temperature dependent, and a decrease in the operating temperature results in a corresponding decrease in the electrical losses in the conductors of the coils. Therefore, the generator becomes more efficient as the operating temperature of the coils decrease.

Thus, many electric machines provide some type of cooling system for the coils. In one such cooling system, cooled air may be directed over or through the coils to remove heat and provide an acceptable operating temperature for the electric machine. In another cooling system, however, a liquid coolant may be directed to flow over or near the coils to remove heat and provide an acceptable operating temperature for the electric machine. No matter the type of cooling system, the thermal resistance between the conductive strands and the outer surface of the coils (e.g., the outer surface subject to the cooling medium), resulting from the insulation necessary to electrically isolate the coils, provides a natural barrier to the amount of cooling that may be achieved from the cooling system.

Industries continually strive to provide electric machines with increased torque and power densities. In the wind turbine industry, for example, there is a desire to provide higher power-producing electric generators with smaller footprints. This may require, for example, further increases to the current density of conductors in the stator core, which may necessitate improvements to the cooling system for the electric generator. While there may be various approaches to improving the cooling system, including using improved coolants, improved materials, improved flow patterns about or through the electric machine, etc., one further approach is to improve coil designs so as to promote improved heat transfer from the coils using the cooling system.

In view of the above, there is a need to improve the cooling of electric machines to further increase power densities. More particularly, there is a need to provide improved coils for electric machines that are designed to provide sufficient electrical insulation for the coils while also reducing the thermal resistance of the coils to cooling using the cooling medium of a cooling system.

SUMMARY

A coil for an electric machine includes a conductive strand having a first end, a second end, and a plurality of windings between the first and second ends, and an electric insulating body within which the conductive strand is at least partially encased, wherein at least a portion of the insulating body includes perforations that allow a coolant to penetrate into the insulating body to cool the coil during use of the electric machine. Thus, the coil is ready for insertion in a machine slot without requiring any resin or vacuum impregnation etc. In one embodiment, the insulating body may be substantially rigid to provide support for the windings and ease handling of the coils during assembly of the electric machine.

In an exemplary embodiment, the conductive strand may include one or more conductors and strand insulation disposed around the one or more conductors. The perforations in the insulating body are, in a preferred embodiment, configured to provide direct physical contact or near contact between the coolant and the conductive strand that forms the windings of the coil. For example, in one embodiment the coil may be configured such that between about 15% and about 80% of the surface area of the conductive strand may be bounded by perforations. Preferably, between about 20% and about 60% of the surface area of the conductive strand may be bounded by perforations.

In one embodiment, the insulating body may be a substantially solid body and the perforations may include a plurality of (discrete or macro) flow channels formed in the otherwise solid body. In an alternative embodiment, the insulating body may be a porous body and the perforations may include a plurality of (micro) flow channels formed by pores in the porous body. For example, the porous body may include a foam material, such as an open cell foam material. The insulating body may be a moulded body at least partially disposed about the conductive strand of the coil. In still a further embodiment, the insulating body may be formed from a honeycomb or lattice structure that defines flow channels in the insulating body. In this embodiment, the insulating body may be a 3-D printed body at least partially disposed about the conductive strand of the coil. The coil is different from a classic coil, where the fabrication method employs use of coil insulation tape around the coil, the insulation tape is a woven or a non-woven tape.

In a further embodiment, an electric machine having a plurality of coils according to that described above is disclosed. The electric machine may further include a cooling system for directing a coolant to the plurality of coils for removing heat from the coils during use of the electric machine. In a particular application, the electric machine takes the form of a wind turbine generator. A wind turbine having a wind turbine generator as described above is also disclosed.

In yet another embodiment, a method of making a coil for an electric machine includes providing a conductive strand having a first end, a second end, and a plurality of windings between the first and second ends, and forming an insulating body about at least a portion of the conductive strand, wherein at least a portion of the insulating body includes perforations that allow a coolant to penetrate into the insulating body to cool the coil during use of the electric machine.

In one embodiment, providing the conductive strand further includes feeding one or more conductors to a looping machine to form a raw coil having the conductive strand in near shape, and stretching the raw coil to net shape of the preformed coil. In one embodiment, the step of forming the insulating body further includes inserting the conductive strand into a mould and injecting a flowable material into the mould to form the insulating body about at least a portion of the conductive strand. In this embodiment, the method may further include positioning a plurality of spacers between adjacent windings of the conductive strand prior to injecting the flowable material into the mould, and removing the plurality of spacers from the insulating body to provide discrete flow channels in the insulating body. In one embodiment, the material that is injected into the mould forms a solid insulating body. In another embodiment, the material that is injected into the mould forms a porous insulating body having pores that define flow channels in the insulating body. In yet another embodiment, the step of forming the insulating body may further include 3-D printing the insulating body to have a honeycomb or lattice structure that defines flow channels in the insulating body.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
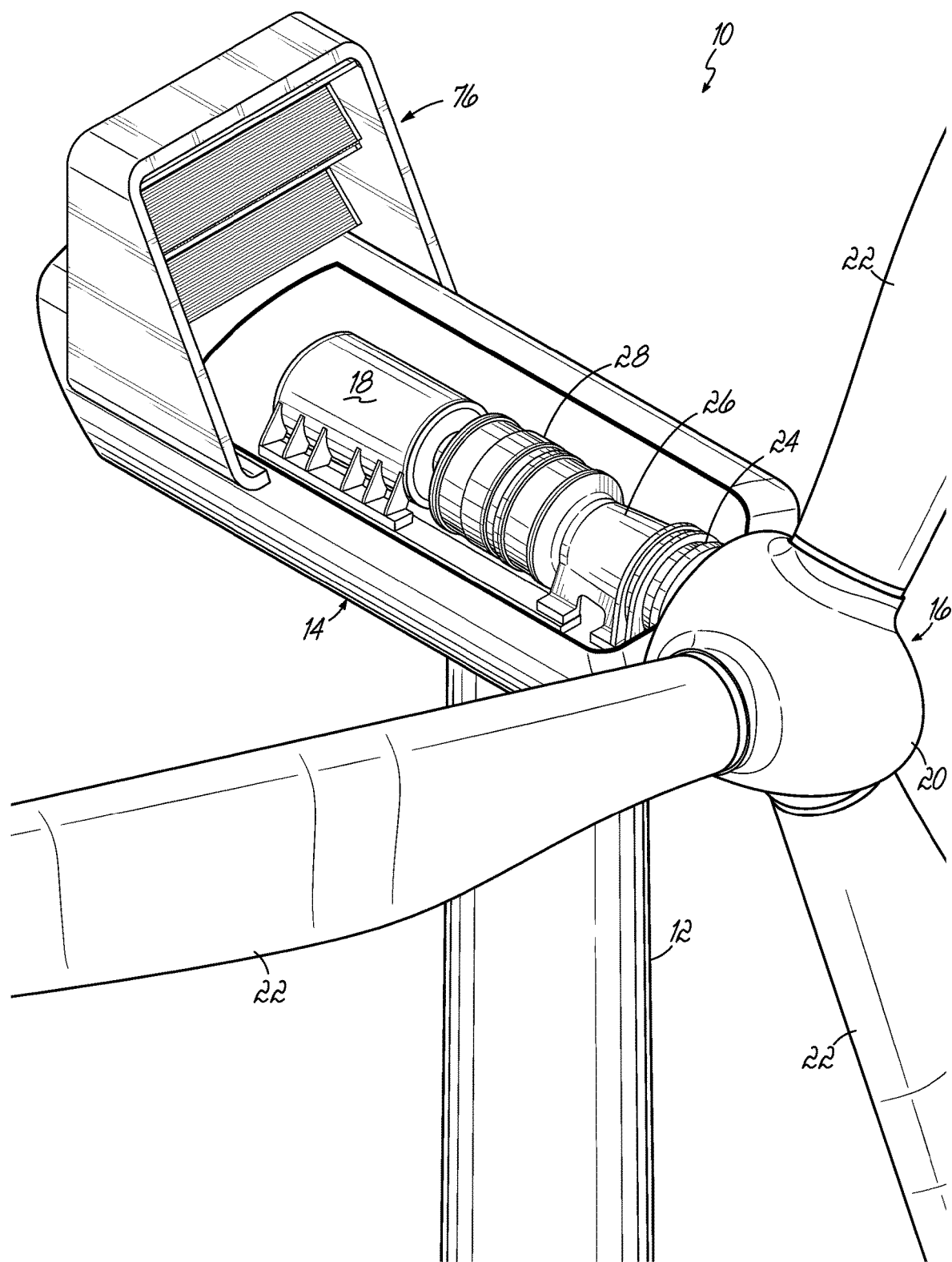
FIG. 1 is a front partial perspective view of a wind turbine having a coil for the generator in accordance with an embodiment of the invention.

With reference to FIG. 1, a wind turbine 10 includes a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, the generator 18 and other components of the wind turbine 10 that are housed inside the nacelle 14. The tower 12 of the wind turbine 10 also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of wind turbine 10 includes a central hub 20 and at least one blade 22 that projects outwardly from the central hub 20 at locations circumferentially distributed thereabout. In the representative embodiment, the rotor 16 includes three blades 22, but the number may vary. The blades 22 are configured to interact with the passing air flow to produce lift that causes the central hub 20 to spin about a longitudinal axis. The design and construction of the blades 22 are familiar to a person having ordinary skill in the art and will not be further described. For example, each of the blades 22 may be connected to the central hub 20 through a pitch mechanism (not shown) that allows the blades to pitch under control of a pitch controller.

The rotor 16 may be mounted on an end of a main drive shaft 24 that extends into the nacelle 14 and is rotatably supported therein by a main bearing assembly 26 coupled to the framework of the nacelle 14. The main drive shaft 24 is operatively coupled to one or more gear stages, which may be in the form of a gear box 28, to produce a more suitable mechanical input to the generator 18 located in the nacelle 14. The gear box 28 relies on various gear arrangements to provide speed and torque conversions from the rotation of the rotor and main drive shaft 24 to the rotation of a secondary drive shaft 30 (FIG. 2) that operates as an input to the generator 18. By way of example, the gear box 28 may transform the relatively low rotational speed of the main drive shaft 24 (e.g., 5 to 25 revolutions per minute (rpm)) to a relatively high rotational speed (e.g., 3,000 rpm or higher) of the secondary drive shaft 30 which is mechanically coupled to the generator 18. Although the wind turbine 10 has been described as an indirect drive system, it should be realized that the wind turbine may also be configured as a direct drive system and remain within the scope of the invention.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

Figure 2:
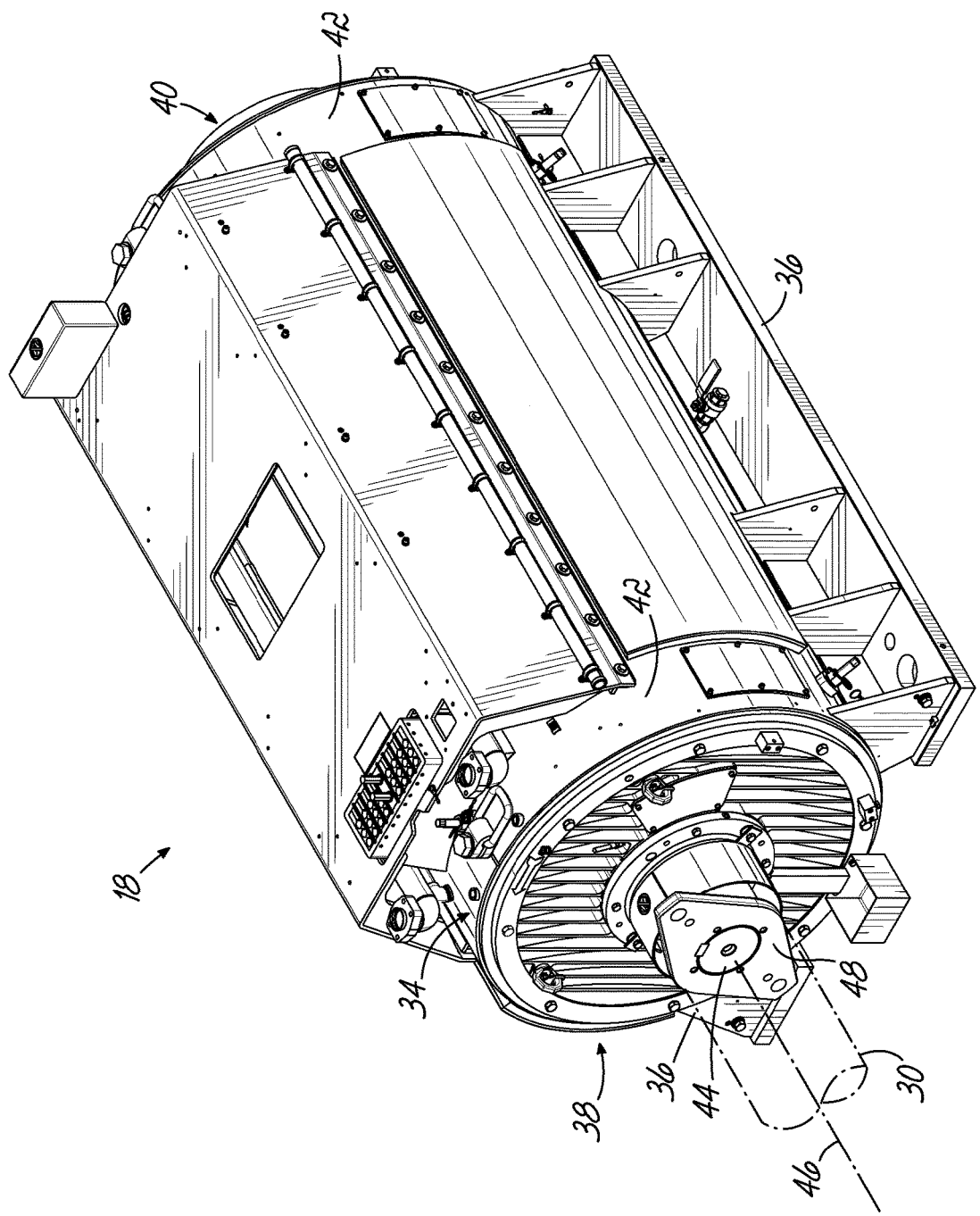
FIG. 2 is a front perspective view of a generator in accordance with an embodiment of the invention.

In reference to FIG. 2, the generator 18 may include an outer housing 34 configured to contain and shield the various internal components of the generator 18 and one or more supports 36 for supporting the generator 18 and for securing the generator 18 to the nacelle 14, such as to a floor or support frame of the nacelle 14. Because the generator 18 is a rotating machine, the outer housing 34 may be generally cylindrical in shape having a first front end 38, a second rear end 40, and a side wall 42 extending therebetween. The cylindrical configuration of the outer housing 34 is merely exemplary, however, and other shapes and configurations are possible for the outer housing 34. A generator drive shaft 44 may be disposed within the outer housing 34 and configured to be rotatable relative to the outer housing 34 about a central axis 46 defined thereby. In this regard, the drive shaft 44 may be rotatably supported relative to the outer housing 34 by one or more bearing assemblies (not shown). A portion of the generator drive shaft 44 may extend from the front end 38 of the outer housing 34 where it may be coupled to the secondary drive shaft 30 on the output side of the gear box 28 via a suitable mechanical coupling 48, as is generally known in the art. Accordingly, the generator drive shaft 44 rotates with the rotation of the secondary drive shaft 30, which is driven by rotor 16.

Figure 3:
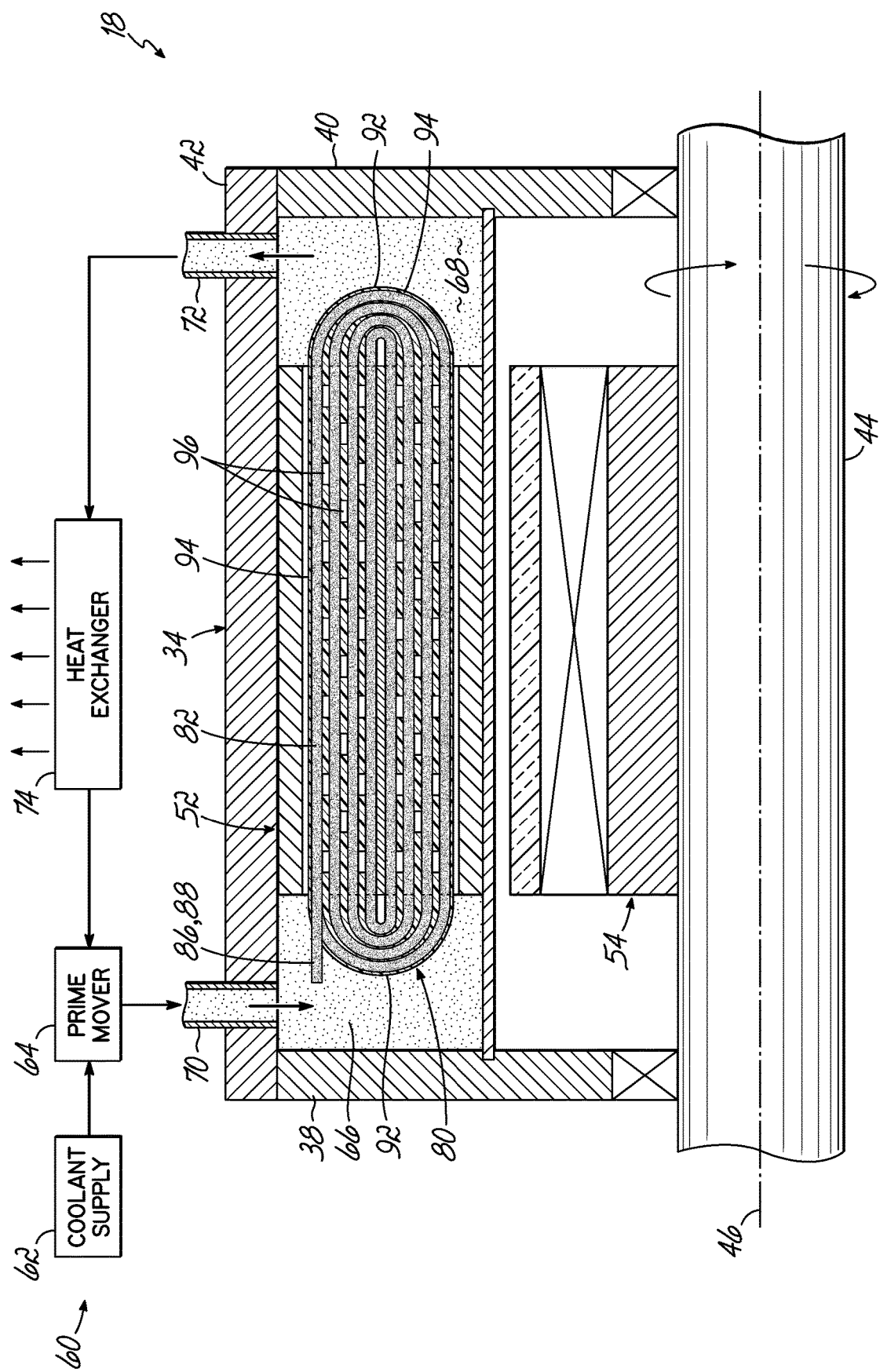
FIG. 3 is a schematic illustration of the generator shown in FIG. 2 with a cooling system for cooling heat generating components of the generator.

In reference to the schematic illustration shown in FIG. 3, the generator 18 includes a stator assembly 52 and a rotor assembly 54 (shown schematically) concentrically disposed relative to each other within the outer housing 34. In an exemplary embodiment, the stator assembly 52 is generally fixed and stationary while the rotor assembly 54 is configured to rotate relative to the stator assembly 52. Thus, the stator assembly 52 may be operatively coupled to the outer housing 34 or to a frame or support wall of the outer housing 34, and the rotor assembly 54 may be operatively coupled to the generator drive shaft 44, wherein the stator assembly 52 is disposed radially outward of the rotor assembly 54. For example, the rotor assembly 54 may include a frame or support which is coupled to the drive shaft 44 such that the rotor assembly 54 rotates with rotation of the drive shaft 44. The stator assembly 52 generally includes a plurality of coils (shown schematically). The rotor assembly 54 generally includes a plurality of magnetic elements (shown schematically) for generating a magnetic field which induces a current in the coils carried by the stator assembly 52. Alternately, the rotor assembly 54 may be on the radially outer side, connected to a rotating shaft/structure and the stationary stator assembly 52 on the radially inner side. This is also known as the outer rotor concept wherein both the stator and rotor assemblies are still concentric. In the disclosure, by way of example, an inner rotor and outer stator concept is used for an explanation of aspects of the present invention. In any event, the stator assembly 52 and rotor assembly 54 of the generator 18 cooperate to convert the mechanical energy received from the wind turbine rotor 16 into electrical energy so that the kinetic energy of the wind is harnessed for power generation. Specifically, the movement of the magnets of the rotor assembly 54 past the stationary coils of the stator assembly 54 induces an electrical current in the coils according to the precepts of Faraday's Law.

As discussed above, the operating temperature of the coils in the stator assembly 52 is an important aspect of generator efficiency and the generator 18 includes a cooling system, shown schematically at 60, to cool the coils in the stator assembly 52 (and perhaps other heat-generating components of the generator 18 as well). The cooling system 60 includes a coolant supply 62 operatively coupled to a prime mover 64 of the cooling system 60 for circulating the coolant 66 through the generator 18. The coolant 66 may be any suitable fluid, such as a gas or liquid, for transferring heat from the coils in the stator assembly 52. For example, a gas coolant may include, without limitation, air, hydrogen, helium, carbon di-oxide, or other suitable gasses. Liquid coolants may include, without limitation, mineral oil, 3M™ Fluorinert™ electronic liquids (e.g., FC-3283, FC-40 and FC 43), 3M™ Novec™ engineered fluids (e.g., 7500 and 7600), DowTherm (synthetic fluid), Syltherm 800 (silicone based), or other suitable liquids. The prime mover 64 may, for example, take the form of a pump (for liquid coolants) or a fan or blower (for gas coolants). The coolant 66 may be configured to remain a single phase or experience a change of phase during the cooling cycle.

The stator assembly 52 is positioned in a closed chamber 68 in the outer housing 34 and the prime mover 64 introduces the (low temperature) coolant 66 into the closed chamber 68 at a fluid inlet 70 adjacent the front end 38 of the generator 18. Under pressure from the prime mover 64 (and perhaps gravity), the coolant 66 flows through the stator assembly 52 and absorbs heat generated by the coils disposed therein. The now heated coolant 66 flows out of the closed chamber 68 through a fluid outlet 72 adjacent the rear end 40 of the generator 18. The (high temperature) coolant 66 flows through a heat exchanger 74 associated with the generator 18 to remove the heat from the coolant 66 and reduce its temperature. The heat exchanger 74 may be one associated with nacelle 14 or wind turbine 10 for cooling a variety of heat-generating components of the wind turbine 10. By way of example, the heat exchanger 74 may be provided by a cooler top 76 (FIG. 1) positioned on the top or sides of the nacelle 14. Other types of heat exchangers and heat sinks may also be possible. In any event, after being cooled in the heat exchanger 74, the (low temperature) coolant is directed to the prime mover 64 for recirculation back through the generator 18. It should be recognized that the cooling system for the generator is not limited to the particular cooling system described herein, but may take a wide range of other forms that utilize a coolant to absorb heat from the coils and dump that heat to an external environment. Such alternative cooling systems that cool the coils of the generator remain within the scope of the present invention.

In accordance with an aspect of the invention, the coils in the stator assembly have been redesigned to reduce the thermal resistance between the conductive strands of the coils and the outer surface of the coils that are subject to the coolant of the cooling system. The reduction in the thermal resistance of the coils improves heat transfer from the coils and allows the coils to operate at a lower temperature. Thought of another way, however, the reduction in the thermal resistance of the coils allows for increased power densities (i.e., power production per unit volume of the stator assembly) for a fixed operating temperature of the coils, and thus generators having a smaller footprint for the same power production. Thus, the redesigned coils allow manufacturers to maximize the power production-to-size ratio for the generator. In accordance with an aspect of the invention, the reduction in the thermal resistance of the coils is achieved by providing perforations in the insulating body in which the conductive strand of the coils is carried.

In this regard, the perforations define flow channels through which the coolant of the cooling system may flow in direct contact with or in close proximity to the conductive strands to enhance heat transfer from the coils. Instead of the generated heat from the conductive strands passing through solid material (e.g., tape layers) of the insulating body from the heat source to the outer exposed surface of the coil via conduction heat transfer, some of that solid material is removed to define flow channels that allow the flow of the coolant through the interior of the insulating body. In this way, the generated heat from the conductive strands is removed via convention heat transfer, which is a more efficient mode of heat transfer, at a location closer to the heat generating source. Thus, heat transfer from the coils is improved. It should be understood, however, that the reduction in the thermal resistance of the coils, through the introduction of perforations in the insulating body, does not come at the expense of the insulating body providing the necessary electrical insulation for the coils. That functionality of the insulating body is maintained in the redesigned coils.

Figure 4:
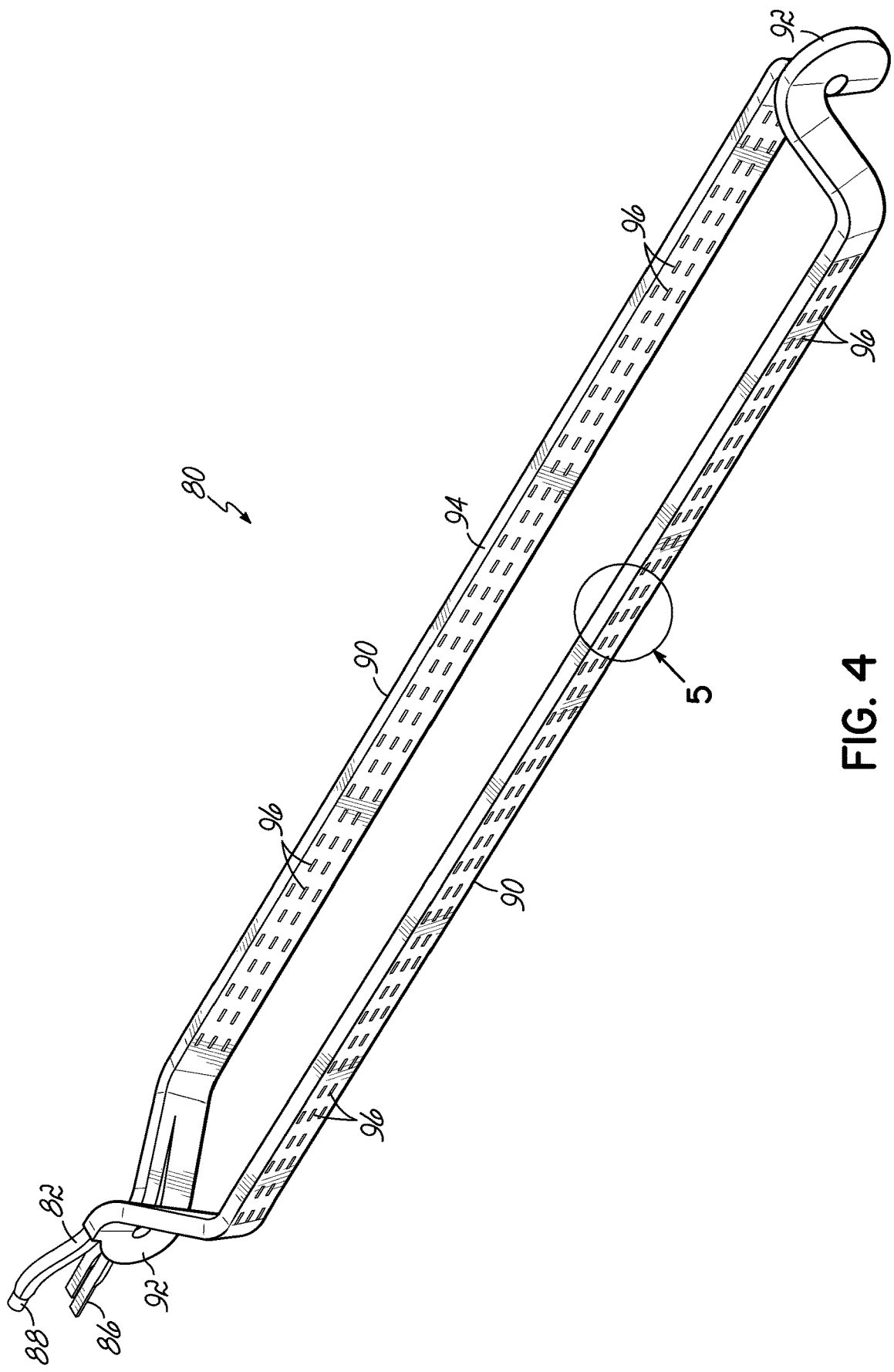
FIG. 4 is a coil for an electric machine in accordance with an embodiment of the invention.
Figure 5:
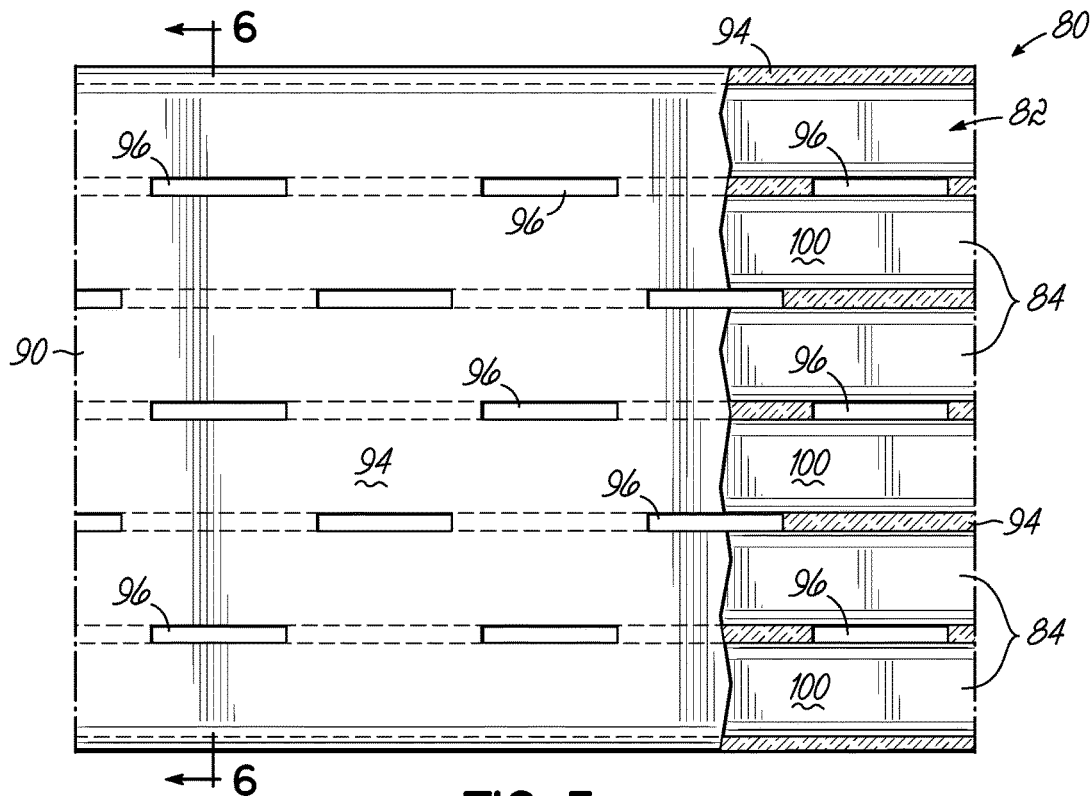
FIG. 5 is an enlarged front view of a portion of the coil illustrated in FIG. 4.
Figure 6:
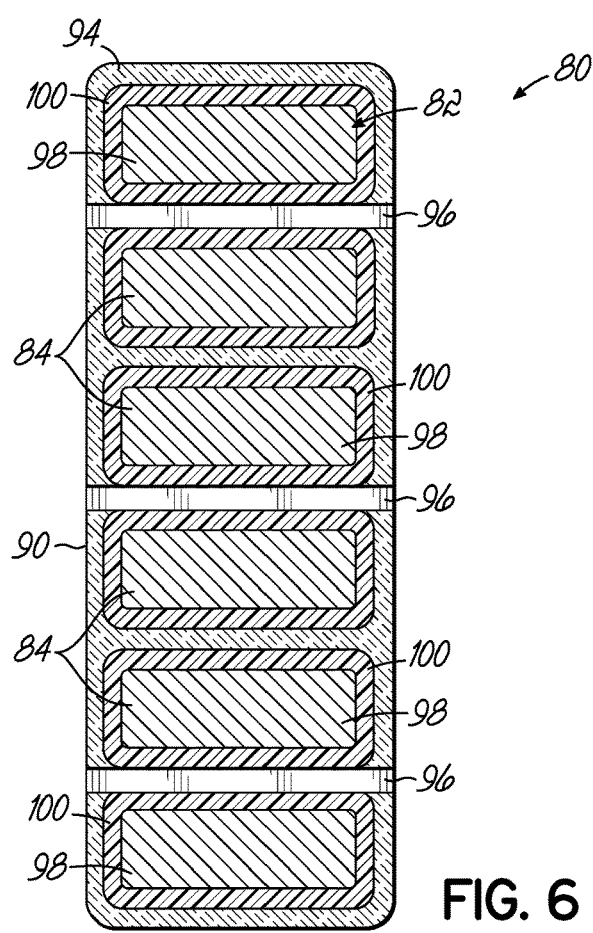
FIG. 6 is a cross-sectional view of the portion of the coil illustrated in FIG. 5.

FIGS. 4-6 illustrate a redesigned coil 80 in accordance with an embodiment of the invention. The coil 80 includes a conductive strand 82 arranged in a plurality of stacked windings 84 that terminate at ends 86, 88. The coil 80 has a looped configuration that includes a pair of generally straight, spaced apart slot windings 90 and a pair of curvilinear end windings 92 at opposed ends of the slot windings 90. The conductive strand 82 may be formed by one or more conductors 98 (one shown in the figures), such as copper wires or strands. In an exemplary embodiment, the conductive strand 82 may include strand insulation 100 surrounding the conductor(s) 98 that form the conductive strand 82 to provide a base level of electrical insulation of the conductor(s) 98. In an exemplary embodiment, the strand insulation may be formed from Mica tape/compound (phlogopite and muscovite), glass tape, enamel coating, thermoplastic material, such as polyvinyl chloride, polyurethane, or other suitable materials. These tapes or coatings have a thickness of the order of 0.01 mm to 0.1 mm. In case of tapes, the strand insulation is applied in overlapped layers where there can be 3 to 6 layers making the total strand insulation thickness in the range of 0.03 mm up to 0.6 mm, for example.

The conductive strand 82 that forms the windings 84 of the coil 80 is at least partially positioned or encased within an insulating body 94 that is configured to provide further electrical insulation between adjacent windings 84 of the coil 80 and between the coil 80 and other portions of the stator assembly 52 in which the coil 80 resides. The insulating body 94 further provides support for the windings 84 of the coil 80 in order to substantially fix their positions relative to each other and relative to the terminals 86, 88 and gives the coil 80 structural rigidity that eases handling of the coils 80 and facilitates their assembly within the stator assembly 52. Thus, in an exemplary embodiment, the insulating body 94 may be substantially rigid. The coil 80 needs to be stiff enough to not vibrate because of high frequency current which the copper conductors carry during converter fed operation. Moreover, the coil 80 should have ample strength to withstand light hammering with a plastic mallet to position the coil 80 snugly in the slots of the stator assembly 52. Furthermore, the stiffness should be enough to support the end winding overhangs without needing much additional support.

In accordance with an aspect of the invention, at least a portion of the insulating body 94 includes perforations 96 that allow a coolant to flow through the coil 80 and closer to the windings 84 of the coil 80. By way of example and without limitation, the insulating body 94 may include perforations 96 only along the slot windings 90 of the coil 80 or portions thereof; only along the end windings 92 of the coil 80 or portions thereof; or along both the slot windings 90 and the end windings 92 of the coil 80. Alternatively, the insulating body 94 may include perforations 96 for the upper windings of the coil 80 while having none for the lower windings, or vice versa. Thus, the inclusion of perforations 96 in the insulating body 94 may take a wide range of configurations and is not limited to the particular arrangements shown herein. Perforations 96 may be provided on the entirety of the insulating body 94 or only on select portions thereof.

The concept is that the perforations 96 allow the coolant 66 from the cooling system 60 to be in direct contact or near contact with an increased surface area of the conductive strand 82 (including the strand insulation, i.e., the outer surface of the strand insulation 100). By way of example and in one embodiment, between about 15% and about 80% of the surface area of the conductive strand 82 (including strand insulation 100) of the coil 80 may be bounded by perforations 96, and therefore subject to coolant 66 of the cooling system 60. More preferably, between about 20% and about 60% of the surface area of the conductive strand 82 of the coil 80 may be bounded by perforations 96. These ranges seek to strike a balance between providing sufficient electrical insulation and structure while reducing the thermal resistance of the coil 80 as a whole to cooling by the coolant 66 of the cooling system 60, thereby improving heat transfer from the coil 80. Thus, it should be understood that other ranges and values are possible depending on the particular application.

As illustrated in FIGS. 4-6, in one embodiment, the insulating body 96 may be formed from a solid, continuous material and the perforations 96 may take the form of discrete flow channels (e.g., macro flow channels) formed therein and extending between adjacent windings 84 in the stack of windings 84 of the conductive strand 82 that forms the coil 80. In one embodiment, the discrete flow channels 96 may be distributed along the length of the windings 84 in a uniformly, spaced-apart manner (see FIG. 4). Moreover, the flow channels 96 may be longitudinally offset from each other in the stack of windings 84 to avoid structural weak spots due to an excessive concentration of perforations 96 in the insulating body 94 (see FIG. 5). The arrangement of the flow channels 96 in the insulating body 96 shown in these figures is merely illustrative and it should be realized that other arrangements are possible. Ultimately, the arrangements provide sufficient electrical insulation, sufficient structural support, and a reduction in the thermal resistance to heat transfer from the conductive strand 82 to the coolant 66 used to cool the coils 80. The flow channels 96 penetrate into the insulating body 94 and preferably extend through the insulting body 94 so that coolant may enter and exit the flow channels 96 at different points (see FIG. 6). The flow channels 96 are generally open to the outer surface of one or more windings 84 of the conductive strand 82 so that coolant flowing through the flow channels 96 is in direct contact or near contact (i.e., within a millimetre or less) with the outer surface of the conductive strand 82 (e.g., the outer surface of the strand insulation 100; see FIG. 6).

A process 102 of making the coil 80 in accordance with an exemplary embodiment of the invention will now be described in reference to the flow chart shown in FIG. 7. In block 104, one or more conductors 98 (e.g., copper conductors) that collectively form the conductive strand 82 may be fed to a looping machine to form a near-shape stack of windings 84 that form a raw coil. In one embodiment, the conductive strand 82 fed to the looping machine may already include strand insulation 100. This step is similar to current apparatuses and methodologies and thus will not be further described herein. In block 106, the raw coil is positioned in a stretching machine in order to stretch the raw coil to the desired net-shape of the preformed manufactured coil. Again, this step is similar to current apparatuses and methodologies and thus will not be further described herein.

Figure 8:
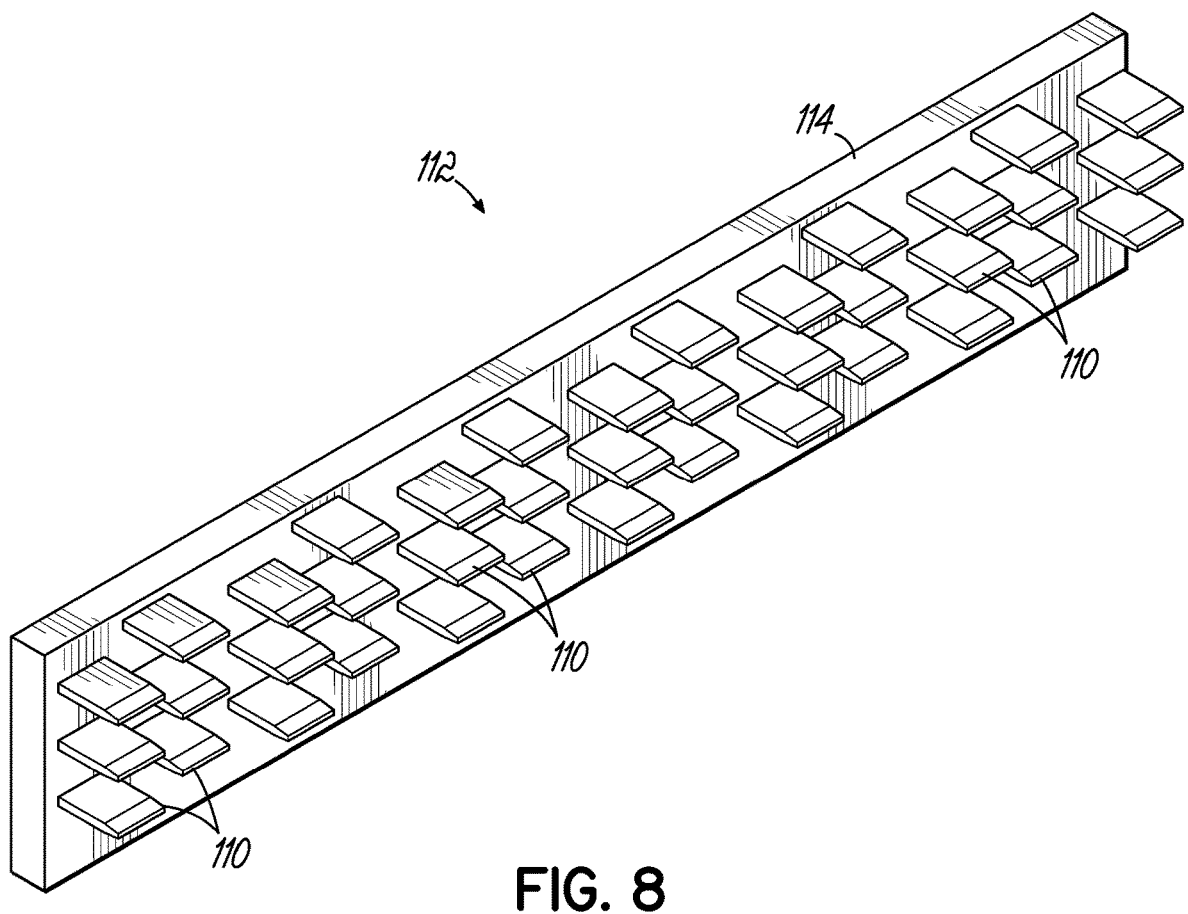
FIG. 8 is a mould insert for forming flow channels in the insulating body of the coil shown in FIG. 4.

As discussed above, one of the drawbacks of existing manufacturing processes is the manner in which the turn insulation is provided to the coil. In one aspect of the invention, the complex taping machines, manual labour, and other inefficiencies associated with current methods may be avoided. Instead, and in an exemplary embodiment, the turn insulation, now provided as the insulating body 96, for the coil 80 may be provided through an injection moulding process, which is a well-known and cost-efficient process. To form the perforations 96 (e.g., in the form of macro flow channels), and as shown by block 108, a plurality of spacers 110 may be positioned between adjacent windings 84 of the conductive strand 82 of the raw coil. In one embodiment, and as illustrated in FIG. 8, the spacers 110 may be provided by one or more mould inserts 112 including a support plate 114 and one or more tab-like spacers 110 extending from a surface thereof. In one embodiment, the one or more mould inserts 112 may be formed from metal, wood, plastics, silicones, or other suitable materials. The material of the one or more mould inserts 112 may be selected so as not to adhere to the material injected into the mould for forming the insulating body 94.

Figure 9A:
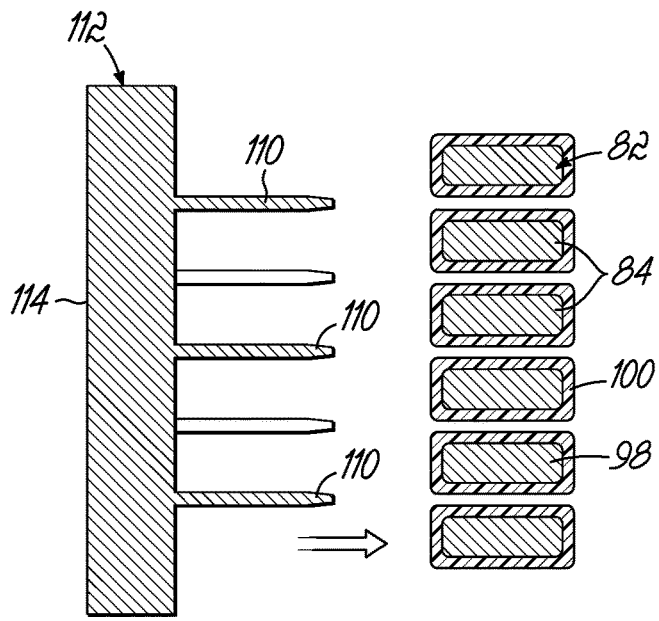
FIGS. 9A-9D are schematic illustrations showing the moulding process for forming the coil shown in FIG. 4.

In use, the one or more mould inserts 112 may be positioned adjacent the raw coil (either before or after positioning the raw coil in the mould) such that the plurality of spacers 110 extend between adjacent windings 84 of the conductive strand 82. This is schematically illustrated in FIG. 9A. FIG. 8 illustrates an embodiment where the support plate 110 includes a plurality of spacers 110 extending therefrom. The spacers 110 may be arranged on the support plate 114 according to a desired arrangement of flow channels 96 in the insulating body 94 of the coil 80 (e.g., staggered arrangement). It should be understood, however, that a mould insert 112 may include just a single spacer 110 and a plurality of mould inserts 112 may be used to form the flow channels 96 in the insulating body 94 of the coil 80. Thus, aspects of the invention should not be limited to the particular arrangement of the mould inserts 112 or the number of spacers 110 provided on each mould insert 112.

Figure 9B:
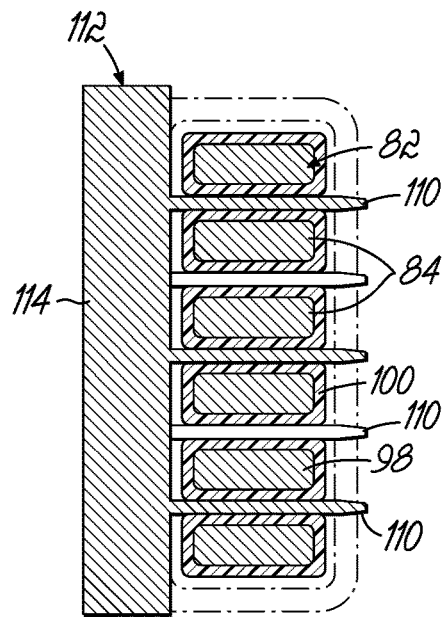
Figure 9C:
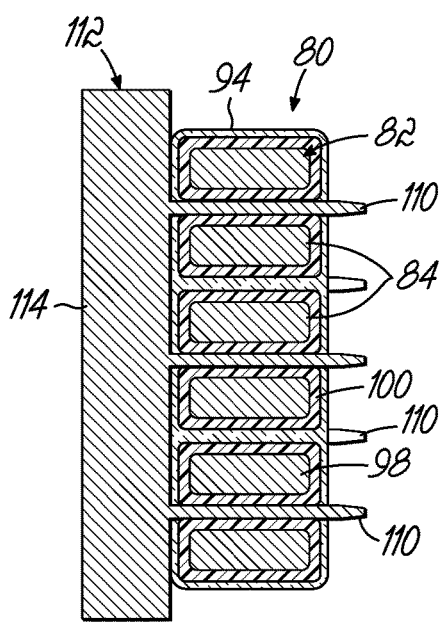
Figure 9D:
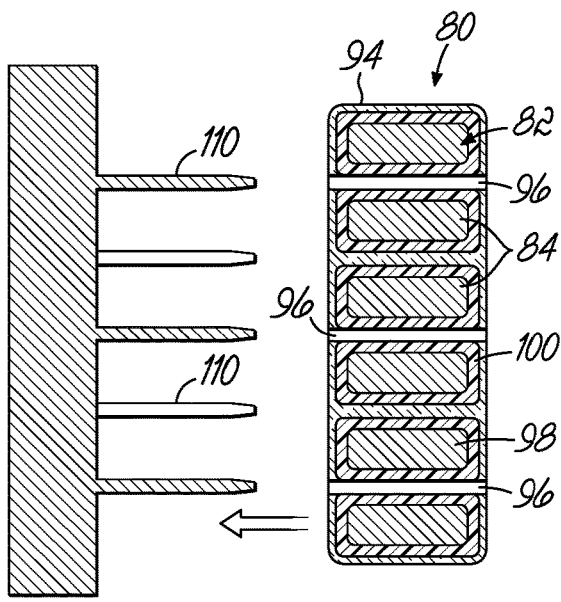

In block 116, the raw coil and spacers 110 of the one or more mould inserts 112 may be positioned in a mould (schematically shown in FIG. 9B) and the mould closed. A flowable and curable material may then be injected into the mould to form the insulting body 94. By way of example, the material injected into the mould may include epoxy, curable resins, ceramic paste, silicone-based materials, polybutadiene, polyurethane, poly-ether/ketone type plastics, or other suitable materials. These processing steps are schematically illustrated in FIGS. 9B and 9C, for example. Aspects of the moulding process are generally known to those of ordinary skill in the art and thus will not be described in further detail herein. After the injected material has cured to form the insulating body 94, and as denoted in block 118, the coil 80 may be removed from the mould and the spacers 110 removed. The void left by the spacers 110 form the flow channels 96 in the insulating body 94. Preferably, the flow channels 96 extend all the way through the insulating body 94. This is schematically illustrated in FIG. 9D, for example.

Figure 10:
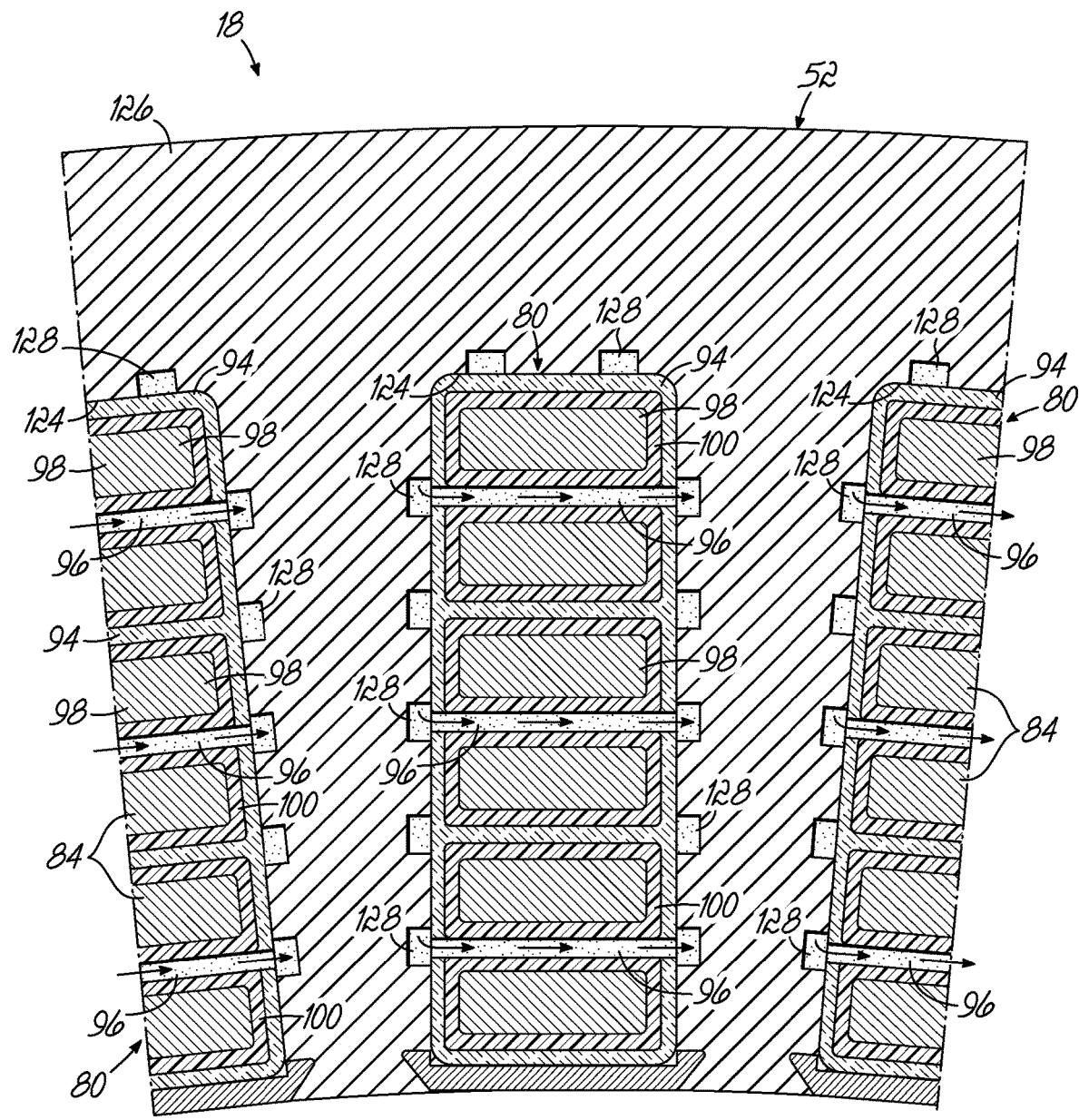
FIG. 10 is a cross-sectional view of a stator assembly of an electrical machine illustrating the position of the coils in the slots of the stator core.

The preformed coil 80 as described above is a self-contained, pre-manufactured unit and a plurality of such coils 80 may be sent to an electric machine manufacturer for assembly with the electric machine. In this regard, FIG. 10 schematically illustrates a coil 80 positioned within a slot 124 of the stator core 126 of the stator assembly 52 of the generator 18 in accordance with an embodiment of the invention. In this embodiment, the stator core 126 includes a plurality of grooves 128 extending along a length of the stator assembly 52. The grooves 128 are open to the slot 124 and are configured to carry coolant 66 from the cooling system 60 from the front end 38 of the generator 18 toward the rear end 40 of the generator 18 under the influence of the prime mover 64 (and possibly gravity; see FIG. 3). In one embodiment, at least some of the grooves 128 may generally align with the spacing between adjacent windings 84 of the coil 80. In this way, when coolant 66 carried by the grooves 128 encounters a flow channel 96 in the insulating body 94 of the coil 80, the coolant 66 may flow through the flow channel 96 and come into direct contact or near contact with the outer surface of the windings 84 of the coil 80, thereby increasing the heat transfer from the windings 84. As noted above, the ability of the coolant 66 to flow through the flow channels 96 in direct contact or near contact with the windings 84 provides an effective reduction in the thermal resistance of the coil 80 to heat transfer due to the coolant 66 of the cooling system 60 flowing therethrough.

The arrangement of the grooves 128 in the stator core 126 is not limited to that shown and described herein but may take a wide range of configurations. The concept is that the coolant 66 carried in one or more of the grooves 128 in the stator core 126 may access the flow channels 96 in the insulating body 94 of the coils 80 to enhance heat transfer from the coils 80. In an alternative embodiment (not shown), instead of the stator core 126 including the grooves 128 for carrying the coolant 66 from the front end 38 of the generator toward the rear end 40 of the generator 18, the coil itself may include the grooves. Thus, the slots 124 of the stator core 126 may be substantially conventional (e.g., with planar walls) and the design of the coil modified to provide the longitudinally extending grooves for carrying the coolant along the length of the stator core. Similar to the above, however, the longitudinally extending grooves in the coil should have access to the flow channels in the insulting body of the coil so that coolant flowing through the grooves may ultimately access the flow channels to enhance heat transfer from the coils. A further embodiment (not shown) may have coolant-carrying grooves formed in the stator core and the coil that provide access to the flow channels in the insulating body of the coils.

Figure 11:
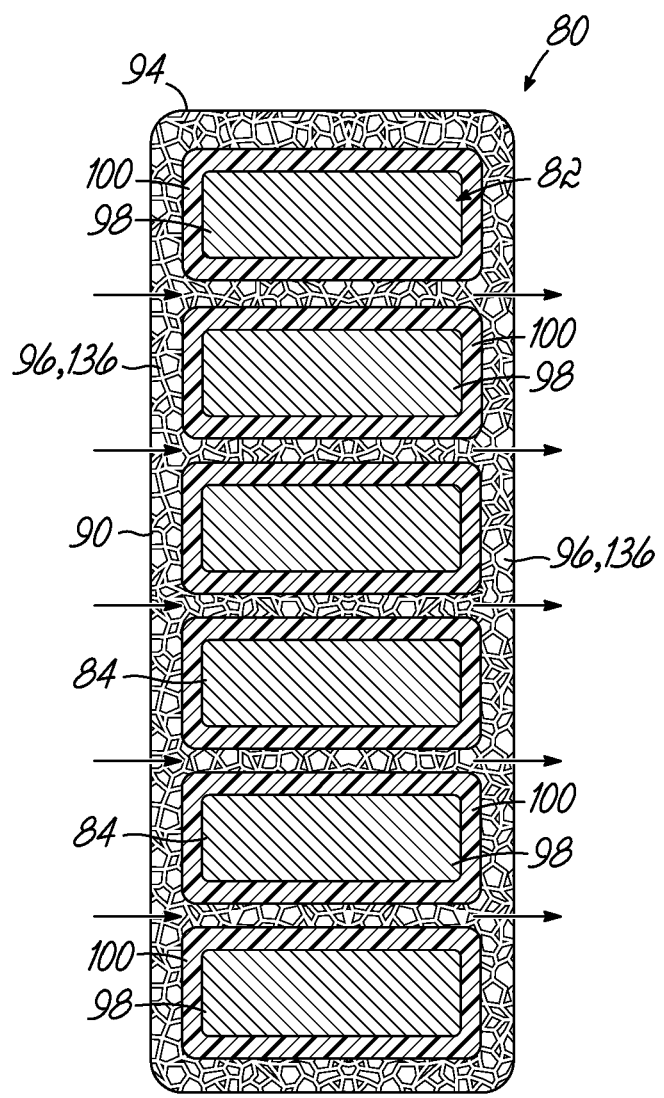
FIG. 11 illustrates a cross-sectional view of a coil in accordance with another embodiment of the invention.

FIG. 11 illustrates a coil 80 in accordance with another embodiment of the invention, wherein like reference numbers refer to like features shown in FIG. 6. The primary difference between this embodiment and that shown in FIG. 6 is the structure of the insulating body 94 and the perforations 96 formed therein. In this regard, the insulating body 94 may be formed from a porous material that defines a plurality of interconnected pores 136 that define flow channels 96 that allow the coolant 66 from the cooling system 60 to penetrate into the insulating body 94, and preferably through the insulating body 94. In one embodiment, the insulating body 94 may be formed by an open cell foam material. By way of example, the foam material may include a variety of polymer, metallic, or ceramic-based foams. Alumina foam, for example, may be used to form the insulating body 94 in one embodiment. Alternatively, carbon, silicon carbide, and silicon nitride foams may also be used. The solid portions of the foam material provide the necessary electrical insulation and/or the structural aspects of the insulating body while the network of pores 136 reduce the thermal resistance of the coil 60 to cooling by the coolant 66 of the cooling system 60. Thus, while there are no discrete flow channels in the insulating body 94, similar to those shown in FIG. 5, coolant 66 is permitted to penetrate into and through the insulating body 94 to cool the heat generating windings 84 of the coil 80 via the interconnected pores 136 of the insulating body.

Figure 7:
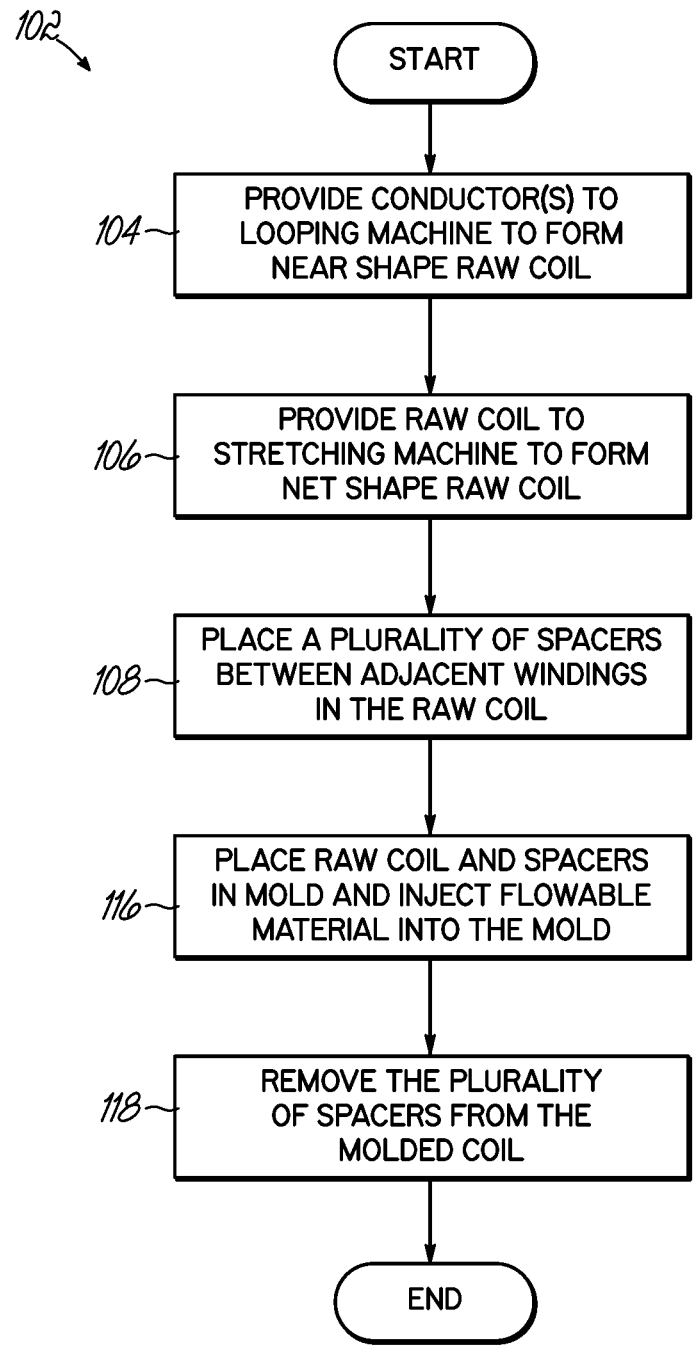
FIG. 7 is a flowchart illustrating a method of making the coil shown in FIG. 4 in accordance with an embodiment of the invention.

The coil 80 having the porous insulating body 94 as shown in FIG. 11 may also be formed through a moulding process similar to that shown in FIG. 7. In this moulding process, however, mould inserts 112 are not necessary to form the perforations 96 in the insulating body 94. Instead, the flowable material that is injected into the mould may include a foaming agent, such as carbon dioxide, nitrogen, argon, or other suitable gasses. During or subsequent to the injection period, the injected material foams to form the open cell pores that define the flow channels into and possibly through the insulating body 94. Injecting suitable materials into a closed mould to form foam articles is generally known to those of ordinary skill in the art and thus will not be described in further detail herein.

It should be recognized that in a further embodiment, the insulating body 94 of the coil 80 may be formed from a porous material to define micro flow channels and may also include macro flow channels similar to those shown in FIG. 5. For example, in the moulding process, one or more mould inserts 112 may be used in conjunction with the flowable foamable material to form both types of flow channels (e.g., macro and micros flow channels) into or through the insulating body 94 of the coil 80. Thus, various aspects of the disclosed embodiments may be combined and remain within the scope of the present invention.

While in the above description, the insulating body 94 of the coil 80 was formed through an injection moulding process, aspects of the invention are not so limited. For example, various alternative methods may be used to form the insulating body 94 about the windings 84 of the coil 80. By way of example and without limitation, the insulating body 94 may be formed through a resin dip process, a crystal growth process, a ceramic deposition process, an additive manufacturing process, or a combination of one or more of the above-identified processes. Thus, aspects of the invention should not be limited to any particular processes, including those described above.

Figure 12:
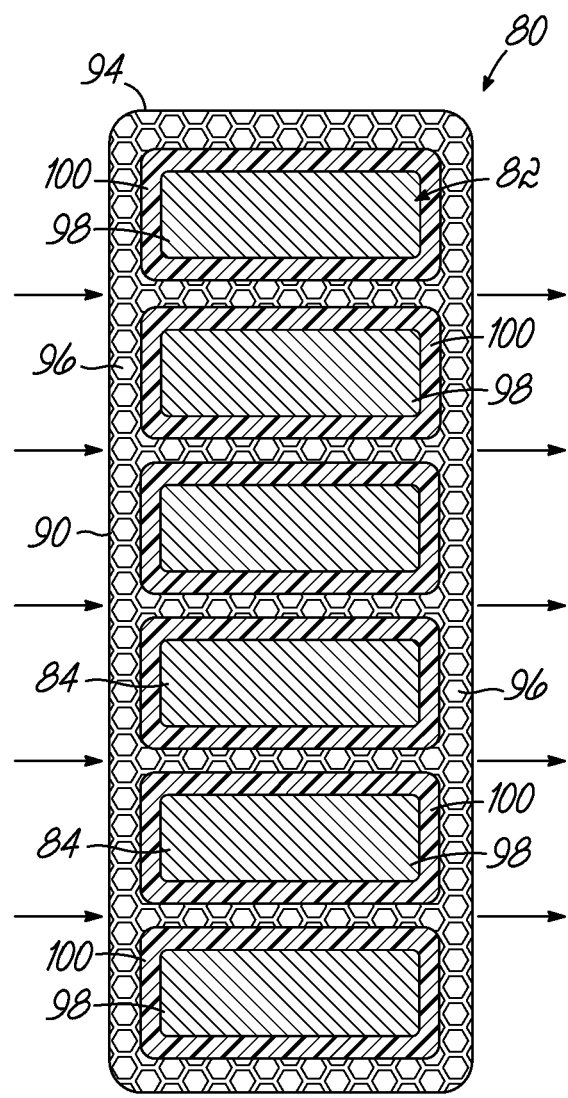
FIG. 12 illustrates a cross-sectional view of a coil in accordance with yet another embodiment of the invention.

For example, additive manufacturing techniques, such as 3-D printing methods, have grown in feasibility and popularity over the last several years for making manufactured parts (as opposed to just prototype parts). In these methods, a print head under the instruction of a controller, moves along a predetermined layered path to selectively deposit a matrix material or a matrix material with fiber to build the insulating body 94 having the perforations 96 formed therein. The additive manufacturing process may build an insulating body 94 similar to that shown in FIG. 5 with the macro flow channels or that shown in FIG. 11 with the micro flow channels. FIG. 12 illustrates a further embodiment that can be formed through an additive manufacturing process. In this embodiment, the insulating body 94 may be configured as a honeycomb or lattice structure that defines flow channels 96 that allow the coolant 66 from the cooling system 60 to penetrate into the insulating body 94, and preferably through the insulating body 94. The solid portions of the honeycomb/lattice structure provide the necessary electrical insulation and the structural aspects of the insulating body 94 while the flow channels reduce the thermal resistance of the coil 60 to cooling by the coolant 66 of the cooling system 60. Thus, while there are no discrete flow channels in the insulating body 94, similar to those shown in FIG. 5, coolant 66 is permitted to penetrate into and through the insulating body 94 to cool the heat generating windings 84 of the coil 80 via the flow channels of the insulating body 94.

In the embodiments described above, the thermal characteristics of a coil of an electrical machine have been improved by providing perforations in an insulating body that at least partially encases the windings of the conductive strand that forms the coil. The perforations, whether that be macro flow channels, micro flow channels, a combination of macro and micro flow channels, or other openings/pathways for a coolant to flow into and/or through the insulating body, allow the coolant from a cooling system to come into direct contact or near contact with the windings of the coil over a greater surface area of the conductive strand as compared to conventional coils. The net result is a reduction in the thermal resistance of the coil to heat transfer from the heat generating windings to the coolant of the cooling system. Accordingly, due to the improved heat transfer from the coils, greater power densities may be achieved for the electric machine.

In addition, embodiments described above provide improved processes for making a coil for an electric machine, and in particular coils having such perforated insulating bodies. More particularly, the insulating body may be disposed about the windings of the coil through less complex and less expensive tooling and methodologies. By way of example, injection moulding methods may be used to form the insulating body about the windings of the coil. These methods are also well suited for producing the perforations in the insulating body. Three-dimensional printing has advanced significantly and has come down in price and offers the ability to design a wide range of insulating bodies with flow channels formed therein.

While aspects of the present invention were shown and described in the context of an electric generator for wind turbine applications, aspects of the invention are not so limited and the improved coils described herein may be beneficial to a wide range of electrical machines, including a wide range a synchronous and asynchronous electric generators and electric motors, magnetic bearings, electromagnets, actuators, solenoids, eddy current brakes, transformers, etc. Thus, aspects of the invention should not be limited to a certain type of electric machine. Further, the invention is not limited to a certain winding type but is applicable to all preformed type of windings such as, without limitation, tooth wound, single layer, concentric, or other winding arrangements. Moreover, while the above described the coils as forming a part of the stator assembly of the electric machine, it should be understood that the coils may be included in the rotor assembly or both the stator assembly and the rotor assembly in various alternative embodiments. Furthermore, it should be understood that the improved coils described herein may be used in radial flux, axial flux or transverse flux machines.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A coil for an electric machine, comprising:
 a conductive strand having a first end, a second end, and a plurality of windings between the first and second ends; and
 an electric insulating body within which the conductive strand is at least partially encased,
 wherein at least a portion of the electric insulating body includes perforations to establish fluid communication of a coolant with the electric insulating body to cool the coil during use of the electric machine, and
 wherein the electric insulating body is a porous body, formed from a honeycomb or lattice structure or a foam material, and the perforations include a plurality of flow channels formed by pores in the porous body.

2. The coil of claim 1, wherein the conductive strand includes one or more conductors and strand insulation disposed around the one or more conductors.

3. The coil of claim 1, wherein the perforations are configured to provide direct contact between the coolant and the conductive strand.

4. The coil of claim 1, wherein between 15% and 80% of a surface area of the conductive strand is bounded by perforations.

5. The coil of claim 1, wherein the electric insulating body formed of the foam material is a molded body disposed around at least a portion of the conductive strand.

6. The coil of claim 1, wherein the electric insulating body formed of the honeycomb or lattice structure is a 3-D printed body disposed about around at least a portion of the conductive strand.

7. The coil of claim 1, wherein between 20% and 60% of a surface area of the conductive strand is bounded by perforations.

8. A method of making a coil for an electric machine, comprising:
- providing a conductive strand having a first end, a second end, and a plurality of windings between the first and second ends; and
- forming an insulating body around at least a portion of the conductive strand, wherein at least a portion of the insulating body includes perforations that allow a coolant to penetrate into the insulating body to cool the coil during use of the electric machine, and
- wherein the insulating body is a porous body, formed from a honeycomb or lattice structure or a foam material, and the perforations include a plurality of flow channels formed by pores in the porous body.

9. The method of claim 8, wherein providing the conductive strand further comprises:
- feeding one or more conductors to a looping machine to form a raw coil having the conductive strand in near shape; and
- stretching the raw coil to net shape of the coil.

10. The method of claim 8, wherein forming the insulating body with the foam material further comprises:
- inserting the conductive strand into a mold; and
- injecting a flowable material into the mold to form the insulating body around at least a portion of the conductive strand.

11. The method of claim 10, further comprising;
- positioning a plurality of spacers between adjacent windings of the conductive strand prior to injecting the flowable material into the mold; and
- removing the plurality of spacers from the insulating body to provide discrete flow channels in the insulating body.

12. The method of claim 8, wherein forming the insulating body further comprises 3-D printing the insulating body to have the honeycomb or lattice structure that defines flow channels in the insulating body.

13. An electric machine, comprising:
- a plurality of coils, each coil comprising:
  - a conductive strand having a first end, a second end, and a plurality of windings between the first and second ends; and
  - an electric insulating body within which the conductive strand is at least partially encased,
  - wherein at least a portion of the electric insulating body includes perforations to establish fluid communication of a coolant with the electric insulating body; and
- a cooling system for directing the coolant to the plurality of coils for removing heat from the coils during use of the electric machine, and
  - wherein the electric insulating body is a porous body, formed of a foam material, and the perforations include a plurality of flow channels formed by pores in the porous body.

14. The electric machine of claim 13, wherein the electric machine is configured as a wind turbine generator.

15. The electric machine of claim 13, wherein the foam material is an open cell foam material.

16. The electric machine of claim 13, wherein the foam material has solid portions that provide electrical insulation and structure to the electric insulating body while the pores reduce thermal resistance of the plurality of coils to cooling by the coolant.

17. The electric machine of claim 13, wherein the foam material forming the electric insulating body does not have discrete flow channels but yet coolant is permitted to penetrate into and through the electric insulating body via the pores networked throughout the electric insulating body.

18. A wind turbine, comprising:
- a tower;
- a nacelle disposed on the tower;
- a wind turbine generator disposed in the nacelle, the wind turbine generator comprising:
  - a plurality of coils, each coil comprising:
    - a conductive strand having a first end, a second end, and a plurality of windings between the first and second ends; and
    - an electric insulating body within which the conductive strand is at least partially encased,
  - wherein at least a portion of the electric insulating body includes perforations to establish fluid communication of a coolant with the electric insulating body; and
- a cooling system for directing the coolant to the plurality of coils for removing heat from the coils during use of the wind turbine generator, and
  - wherein the electric insulating body is a porous body, formed from a honeycomb or lattice structure, and the perforations include a plurality of flow channels formed by pores in the porous body.

19. The wind turbine of claim 18, wherein the honeycomb or lattice structure forming the electric insulating body does not have discrete flow channels but yet coolant is permitted to penetrate into and through the honeycomb or lattice structure.

* * * * *